Dec. 1, 1964     K. K. KROFFKE     3,159,373
FLUID PRESSURE ACTUATED FLEXIBLE SLEEVE VALVE
Original Filed July 12, 1960
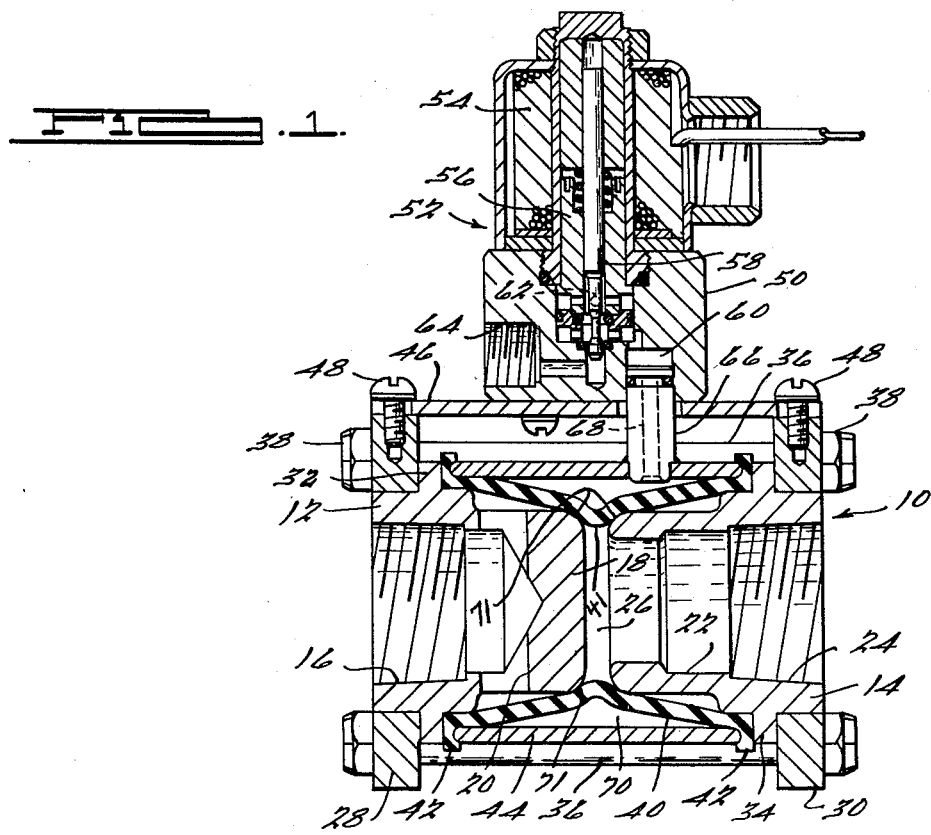
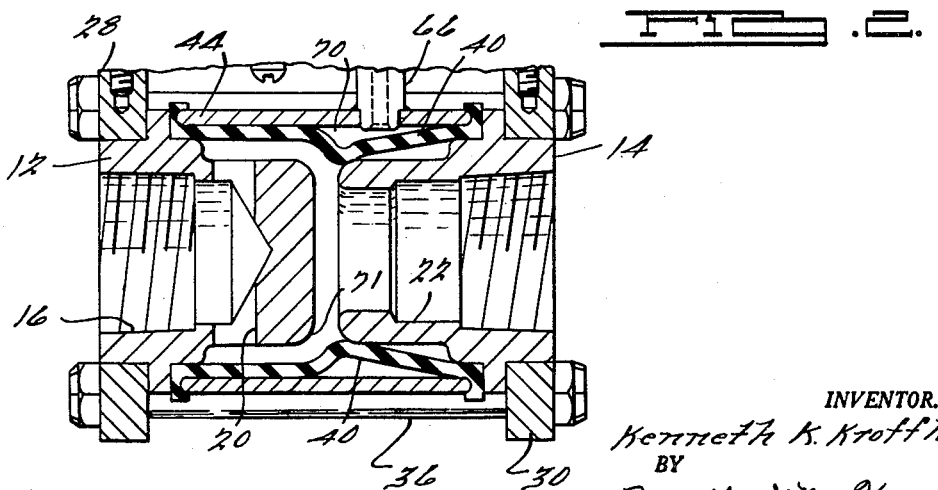
INVENTOR.
Kenneth K. Kroffke.
BY
Balluff and McKinley
ATTORNEYS.

United States Patent Office 3,159,373
Patented Dec. 1, 1964

3,159,373
FLUID PRESSURE ACTUATED FLEXIBLE
SLEEVE VALVE
Kenneth K. Kroffke, Parma, Ohio, assignor to Airmatic Valve, Inc., Cleveland, Ohio, a corporation of Ohio
Continuation of application Ser. No. 42,397, July 12, 1960. This application Nov. 26, 1963, Ser. No. 325,919
2 Claims. (Cl. 251—5)

This invention relates to valves and has particular reference to a new and improved flow control valve. A valve constructed according to this invention is particularly suited for use in installations in which liquids containing abrasives or grit or other similar material must be handled. In conventional valve constructions the abrasive material causes extreme wear of the valve seat and valve closure member requiring frequent service or replacement of these parts. The present invention is intended to overcome these disadvantages by the provision of a novel valve element and valve sealing arrangement adapting the same for use in the handling of liquids containing abrasives or the like, although the use of the present valve is not limited to such installations but may be used to control the flow of any type of liquid or gas.

In general, the invention comprises a valve body having an inlet and an outlet at its opposite ends and one or more radial passages leading from at least one of the inlet or outlet passages to the exterior surface of the valve body, and an imperforate rubber sleeve which may be constricted into sealing engagement with a valve seat formed on the exterior of the valve body to close the communication between the inlet and outlet passages.

A principal object of the invention is to provide a new and improved flow control valve.

Another object of the invention is to provide a valve which is particularly adapted for the handling of fluids containing abrasive material.

A further object of the invention is to provide a novel valve closure member for a flow control valve.

Other and further objects of the invention will be apparent from the following description and claims and may be understood by reference to the acompanying drawing, which by way of illustration shows a preferred embodiment of the invention and what I now consider to be the best mode of applying the principles thereof. Other embodiments of the invention may be used without departing from the scope of the present invention as set forth in the appended claims.

In the drawings:

FIG. 1 is a sectional view through a valve constructed according to the present invention and showing the valve in its closed position; and FIG. 2 is a view similar to FIG. 1 and showing the valve in its open position.

Referring to FIGS. 1 and 2, the valve comprises a valve body 10 consisting of two aligned, oppositely oriented end plugs 12 and 14 of identical construction and size except for the machining thereof. The inlet plug 12 is provided with a threaded inlet passage 16 which is closed at its inner end by the end wall 18 of the plug 12. A series of radial passages 20 intersect the inlet 16 and communicate the same with the exterior of the inlet plug 12. The plug 14 is provided with a bore 22 extending axially therethrough and threaded at its outer end as at 24. The inner ends of the plugs 12 and 14 are spaced apart to define a relatively narrow gap 26, and the exterior end surfaces of said plugs form spaced annular valve seats 71 around said gap, with the gap 26 between and bounded by the valve seats 71.

End plates 28 and 30 are seated against shoulders 32 and 34 formed on the end plugs 12 and 14, respectively, and are apertured to receive the rods 36 which have threaded ends receiving nuts 38.

A generally cylindrical imperforate rubber sleeve 40 surrounds the inner ends of the end plugs 12 and 14 and is provided at its opposite ends with radially extending flanges 42 which are confined between the shoulders 32 and 34 and a cylindrical tubular member 44 which surrounds the sleeve 40 in spaced relation to the inner ends of the end plugs 12 and 14. When the nuts 38 are tightened onto the tie rods 36, the flanges 42 on the sleeve 40 will be tightened into sealing engagement with the end plugs 12 and 14 and the tubular member 44.

A supporting plate 46 is secured onto the end plates 28 and 30 by screws 48 and supports a valve body 50 forming a part of a solenoid actuated pilot valve indicated at 52. The pilot valve 52 may be of any suitable construction and includes a solenoid coil 54 and a reciprocable core member 56 cooperable with a valve stem 58 for alternately communicating the work port 60 with an inlet port 62, which may be connected to a suitable source of air under pressure and with an exhaust port 64. The work port 60 receives a conduit 66 having a passage 68 therein for supplying the air under pressure through the pilot valve 52 into the space 70 between the tube 44 and the rubber sleeve 40 and for exhausting the air back through the passage 68 and through the pilot valve to the exhaust port 64.

The valve 10 is shown in its closed position in FIG. 1 at which time the solenoid is de-energized so as to establish communication between the inlet 62 and work port 60 and the pilot valve 52. The sleeve 40 may be made of any suitable material, preferably rubber, although the use of such term in the claims is not intended in a limiting sense but for descriptive purposes only. The sleeve is molded as shown in FIG. 1 with an intermediate portion of reduced diameter in the form of an annular rib 41 so that in its natural and closed condition it will sealingly engage valve seats 71 formed on the exterior surface of the inner ends of the plugs 12 and 14. When the valve is closed, the pressure fluid supplied through the pilot valve 52 holds the intermediate portion of sleeve 40 in sealing engagement with the valve seats 71 against the pressure of the fluid in the inlet 16 with rib 41 positioned within gap 26. When the solenoid 54 is energized, the inlet 62 of the pilot valve will be closed and communication between the work port 60 and the exhaust port 64 will be established, thereby exhausting the pressure fluid from the annular space 70 between the sleeve 40 and tubular member 44. The pressure of the fluid in the inlet 16 of the valve 10 will expand the sleeve 40 out of contact with seat 71 on plug 12 in the manner shown in FIG. 2 to establish communication between the radial passages 20 in the inlet plug 12 and the axial bore 22 in the outlet plug 14. When the pilot valve 52 is again de-energized, the work port 60 will be communicated with the inlet 62 to supply the pilot pressure fluid to the annular space 70 and constrict the sleeve 40 into the gap 26 between the opposed ends of the plugs 12 and 14 so that the sleeve 40 will sealingly engage both of the valve seats 71 to close communication between the inlet 16 and the outlet 24 of the vlave 10. The pilot valve 52 may be similar to that shown in Patent No. 2,948,298, or any other suitable type may be employed.

A shown in the drawings, the valve seats 71 engage and cooperate with the intermediate reduced diameter portion of the sleeve 40 and particularly with rib 41 thereof to limit the axial as well as the inward flexure of the sleeve 40 under the various pressures to which it is subjected in its closed and open positions.

This application is a continuation of my prior copending application Serial No. 42,397, filed July 12, 1960, for "Valve."

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A flow control valve comprising a pair of axially aligned, spaced, oppositely oriented end plugs, a tubular body secured in fixed surrounding spaced relation to one end of each of said plugs, said ends being of the same diameter, an annual imperforate rubber sleeve surrounding said ends of said plugs and disposed within said body so that the intermediate portion of said sleeve is expansible and contractible relative to said ends of said plugs, one of said end plugs having an axial bore therethrough forming an outlet for the valve and the other of said end plugs having an axial bore forming an inlet for the valve and being closed at its inner end, and a radial passage communicating with said bore and with the interior of said rubber sleeve so as to provide fluid flow communication between said bores, the inner ends of said end plugs being axially spaced apart to define a narrow axially extending gap therebetween and so that the exterior surfaces of said plugs form spaced annular parallel valve seats around said gap with said gap between and bounded by said valve seats, said axial bore in said one end plug opening into said gap whereby said gap forms a part of the fluid flow path through said valve, the intermediate portion of said sleeve being of reduced diameter relative to the end portions thereof and normally constricted into said gap so as to sealingly engage said valve seats to close communication between said bores in said end plugs, said valve seats cooperating with the intermediate reduced diameter portion of said rubber sleeve so as to limit the inward and axial flexure thereof under the fluid pressure to which said sleeve is subjected, said intermediate portion of said sleeve being radially expansible out of contact with said one plug and the valve seat provided thereon in response to a predetermined pressure differential on the interior and exterior of said sleeve so as to permit fluid flow from the inlet to the outlet, the space between said sleeve and tubular body forming an expansible pressure chamber to which fluid under pressure is supplied for controlling the expansion and contraction of said sleeve.

2. A valve according to claim 1 wherein said sleeve includes an annular inwardly extending rib which in the closed position of said valve projects into said gap.

References Cited by the Examiner

UNITED STATES PATENTS

| | | | |
|---|---|---|---|
| 994,167 | 6/11 | Koppitz | 137—492 |
| 1,883,960 | 10/32 | Koppel | 251—4 |
| 2,622,620 | 12/52 | Annin | 251—5 |
| 2,994,336 | 8/61 | Bryan | 251—5 X |

FOREIGN PATENTS

| | | |
|---|---|---|
| 800,039 | 1958 | Great Britain. |
| 986,407 | 1951 | France. |
| 1,054,798 | 1958 | Germany. |
| 1,080,029 | 1954 | France. |
| 1,209,475 | 1959 | France. |

ISADOR WEIL, *Primary Examiner.*

WILLIAM F. O'DEA, *Examiner.*